UNITED STATES PATENT OFFICE.

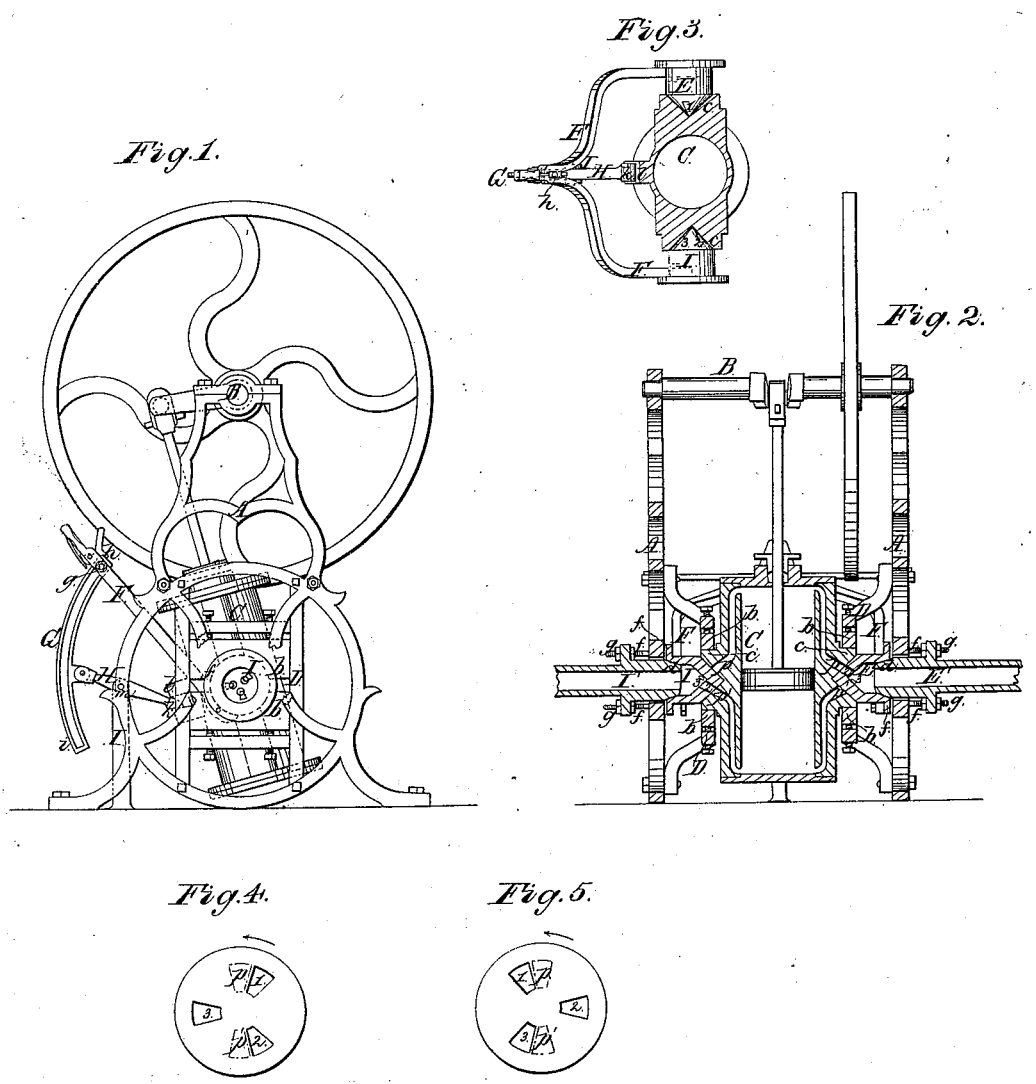
C. F. Wood,
Oscillating Steam Engine.
N° 12,299.   Patented Jan. 23, 1855.

GEO. F. WOOD, OF ULYSSES, NEW YORK.

OSCILLATING ENGINE.

Specification of Letters Patent No. 12,299, dated January 23, 1855.

*To all whom it may concern:*

Be it known that I, GEORGE F. WOOD, of Ulysses, in the county of Tompkins and State of New York, have invented certain new and useful Improvements in Oscillating Steam-Engines; and I do hereby declare that the following is a full, clear, and exact description of the same, reference being had to the accompanying drawings, forming part of this specification, in which—

Figure 1 is a side elevation of an engine constructed according to my invention, having a portion of the framing broken away and the induction pipe taken away. Fig. 2 is a vertical section of the same complete. Fig. 3 is a plan of the induction and eduction valves and their gear, with a section of the cylinder. Figs. 4 and 5 are diagrams of the faces of the valves illustrative of the induction and eduction of the steam and of the reversal of the engine.

Similar letters of reference indicate corresponding parts in the several figures.

This invention relates to the arrangement and mode of operating the valves by which the induction and eduction of the steam are performed, and the reversal of the engine effected.

A, A, are two standards carrying the bearings for the crank shaft B, and having bolted to their inner sides two frames D, D, which contain the bearings $b$, $b$, of the cylinder trunnions $c$, $c$, which are cast with the cylinder C. The cylinder trunnions have conical recesses or seats bored or turned out truly within them to receive the conical faces of the induction and eduction valves I and E. These valves are bored out at their backs, a little tapering, to receive the tapered nozzles $d$, $d$, of the induction and eduction pipes I′, and E′. The induction and eduction pipes pass through suitable openings in the standards A, A, and are provided outside the standards with flanches $e$, $e$, to receive bolts $f$, $f$, which are screwed into the standards and furnished with nuts $g$, $g$, for the purpose of adjusting the nozzles and valves—the valves being kept in their places by the nozzles and held in such a manner as to turn freely but at the same time to fit steam tight both around the nozzles and in the conical seats in the cylinder trunnions.

The valves are both precisely alike in construction each having three ports 1, 2, 3, arranged as shown in Figs. 4 and 5 equidistant and within the same circles; and the seats in the trunnions have each two precisely similar ports $p$, $p'$, arranged opposite each other as indicated by red outlines in Figs. 4 and 5, and shown also in section in Fig. 2 leading to opposite ends of the cylinder.

Fig. 4 exhibits the arrangement of the ports of the induction and Fig. 5 those of the eduction valves, both being supposed to be seen looking from the induction. The position shown is when the crank is on either center and the ports $p$ and $p'$ of both sides of the cylinder closed. Suppose it on the top center, the oscillation of the cylinder in the direction of the black arrows will bring the port 1, of the induction valve opposite the upper port $p$ of the induction side, and the port $p'$ of the eduction valve opposite the port 3 of the eduction side of the cylinder and thus take steam above and exhaust from below the piston. Or suppose it to be on the bottom center, the oscillation in the opposite direction will give steam through the opening 2 to the lower induction port $p'$, and exhaust through the upper eduction port $p$, and the opening 1 of the eduction valve.

The changing of the position of the induction and eduction valves by turning them one sixth of a revolution on the nozzles of the pipes will effect the reversal of the engine. This will be understood by supposing Fig. 5 to be the induction and Fig. 4 the eduction valves, when it will be seen that it requires an oscillation in the opposite direction to that indicated by the black arrows to admit the steam above and exhaust from below the piston, as was before done by an oscillation in that direction.

The change of position of the valves to reverse the engine is effected by a forked lever F, which is bolted to two flanches $f$, $f$, one on each of the valves so that it will move both the same distance. This lever is furnished with a stud $g$, which fits in a slot in an arc G, which is described from the axis of oscillation of the cylinder and which as far as the reversing of the engine is concerned may be stationary, though it has a slight movement for another purpose to be hereinafter explained. The lever is also furnished with a spring catch $h$, which will either hold the lever at the upper part of the arc as shown in Fig. 1, by catching on the top of the arc, or may hold it at the lower part by catching in a notch *i*, near the bottom. The distance between the upper and lower of said positions is just sufficient to move the valves for reversal. If a notch is provided any where near the middle of the arc, the engine may be stopped by bringing the catch into the said notch.

The arc G, is attached by a pin *j*, to one end of a lever H, whose fulcrum *m*, is in a standard I, and whose opposite end *k*, enters a notch in a piece *l*, which stands out from the front of the cylinder. The oscillation of the cylinder gives a vibrating motion to the lever H, and through it gives a rising and falling movement to the arc G, which gives an oscillating movement to the lever F, and to the valves E, and I, the valves always moving in the opposite direction to the cylinder. This movement is for the purpose of opening the ports in the cylinder quickly by causing the ports in the valves to move toward them to meet them.

The peculiar characteristics of the operation of this engine, are the quick opening of the ports and the simple and easy reversal.

Having thus fully described my invention I will proceed to state what I claim and desire to secure by Letters Patent.

I do not claim the induction and eduction of the steam by the oscillation of the cylinder bringing its ports at proper times into and out of communication with ports in the ends of the induction and eduction pipes or in disks connected therewith, but

I claim—

1. The arrangement of the separate induction and eduction valves I and E communicating with separate induction and eduction ports and passages through the two trunnions, and connected with the same lever F, substantially as herein set forth to move simultaneously and the same distance, for stopping or reversing the engine.

2. And I also claim transmitting an oscillating motion from the cylinder to the valve lever F, substantially as described for the purpose of moving the valves for their ports to meet those of the cylinder trunnions, and thus cause a quick induction and eduction.

GEORGE F. WOOD.

Witnesses:
CHARLES WOOD,
CHARLES B. OWEN.